United States Patent
Pawlowski et al.

[11] Patent Number: 5,978,737
[45] Date of Patent: Nov. 2, 1999

[54] METHOD AND APPARATUS FOR HAZARD DETECTION AND DISTRACTION AVOIDANCE FOR A VEHICLE

[75] Inventors: Stephen S. Pawlowski, Beaverton, Oreg.; Andrew F. Glew, Madison, Wis.; George R. Hayek, Cameron Park; Harshvardhan P. Sharangpani, Santa Clara, both of Calif.; Richard C. Calderwood, Portland, Oreg.

[73] Assignee: Intel Corporation, Santa Clara, Calif.

[21] Appl. No.: 08/953,863

[22] Filed: Oct. 16, 1997

[51] Int. Cl.$^6$ ........................................................ G01S 7/78
[52] U.S. Cl. ........................... 701/301; 701/34; 340/435; 340/436; 340/438; 340/903; 180/271
[58] Field of Search ............................... 701/34, 207, 213, 701/301; 340/435, 436, 438, 439, 903, 459; 180/271

[56] References Cited

U.S. PATENT DOCUMENTS

| | | | |
|---|---|---|---|
| 5,629,851 | 5/1997 | Williams et al. | 701/301 |
| 5,631,639 | 5/1997 | Hibino et al. | 701/301 |
| 5,633,644 | 5/1997 | Schussler et al. | 701/301 |
| 5,646,612 | 7/1997 | Byon | 701/301 |
| 5,786,750 | 7/1998 | Cooper | 340/435.5 |

Primary Examiner—William A. Cuchlinski, Jr.
Assistant Examiner—Gertrude Arthur
Attorney, Agent, or Firm—Blakely, Sokoloff, Taylor & Zafman LLP

[57] ABSTRACT

A system for detecting hazardous conditions during operation of a vehicle. In one embodiment, the system includes a plurality of sensors that monitor a plurality of conditions and transmit condition signals each representing a measure of a condition. A plurality of rate determination circuits is coupled to the sensors and continually receives the condition signals, wherein each rate determination circuit calculates rates of change for the condition, including a baseline rate of change, and outputs a potential hazard value representing a deviation of a rate of change from the baseline rate that exceeds a predetermined threshold value. An evaluation circuit receives the potential hazard value, calculates a new potential hazard value using the potential hazard value and a rate of change for at least one associated condition and determines whether an actual hazard exists by comparing the new potential hazard value with a stored value that corresponds to the condition.

21 Claims, 2 Drawing Sheets

METHOD AND APPARATUS FOR HAZARD DETECTION AND DISTRACTION AVOIDANCE FOR A VEHICLE

FIELD OF THE INVENTION

The present invention relates to the field of safety systems for automotive vehicles.

BACKGROUND OF THE INVENTION

In many parts of the world, people are spending increasing amounts of time driving in automobiles. At the same time, technology is becoming available to allow a driver to perform an ever increasing number of functions in addition to driving the automobile. For example, in addition to listening to the radio, searching for a radio station, inserting a compact disc into a compact disc player, or adjusting a temperature control unit, a driver may dial a telephone number and talk on the telephone, all while operating the vehicle. The combined effect of increased time in the automobile, especially for repetitive trips like commuting to work, and the proliferation of distractions such as the car telephone, is to make a driver increasingly less alert to change conditions inside and outside the automobile that constitute hazards.

Some devices currently exist to aid an operator of a vehicle in becoming aware of potential hazards. For example, the airline industry uses collision avoidance radar to detect potential collisions between an aircraft and another object. It is also possible to use a radio direction finder to detect objects in the possible path of a vehicle. Existing automobile hazard detection systems, however, are of limited intelligence. In particular, they detect a limited group of hazards and provide a limited group of responses, for example, manipulating a car's braking system in response to detecting skidding, or activating a collision alarm in response to detecting an imminent collision.

SUMMARY OF THE INVENTION

A system for detecting hazardous conditions during operation of a vehicle is described. In one embodiment, the system includes a plurality of sensors that monitor a plurality of conditions and transmit condition signals each representing a measure of a condition. A plurality of rate determination circuits is coupled to the sensors and continually receives the condition signals, wherein each rate determination circuit calculates rates of change for the condition, including a baseline rate of change, and outputs a potential hazard value representing a deviation of a rate of change from the baseline rate that exceeds a predetermined threshold value. An evaluation circuit receives the potential hazard value, calculates a new potential hazard value using the potential hazard value and a rate of change for at least one associated condition and determines whether an actual hazard exists by comparing the new potential hazard value with a stored value that corresponds to the condition.

DETAILED DESCRIPTION

The method and apparatus described herein detects a variety of hazardous conditions using multiple sensors. Information from the sensors is digitized, and the digitized information is used to generate a baseline ("normal") rate of change value for the condition monitored. Deviations from the baseline rate of change that have been previously defined as unacceptable cause the system to take an appropriate one of several possible responses. An unacceptable deviation may be the result of a change in one of the monitored conditions, or the result of changes in more than one interdependent condition.

Figure 1:
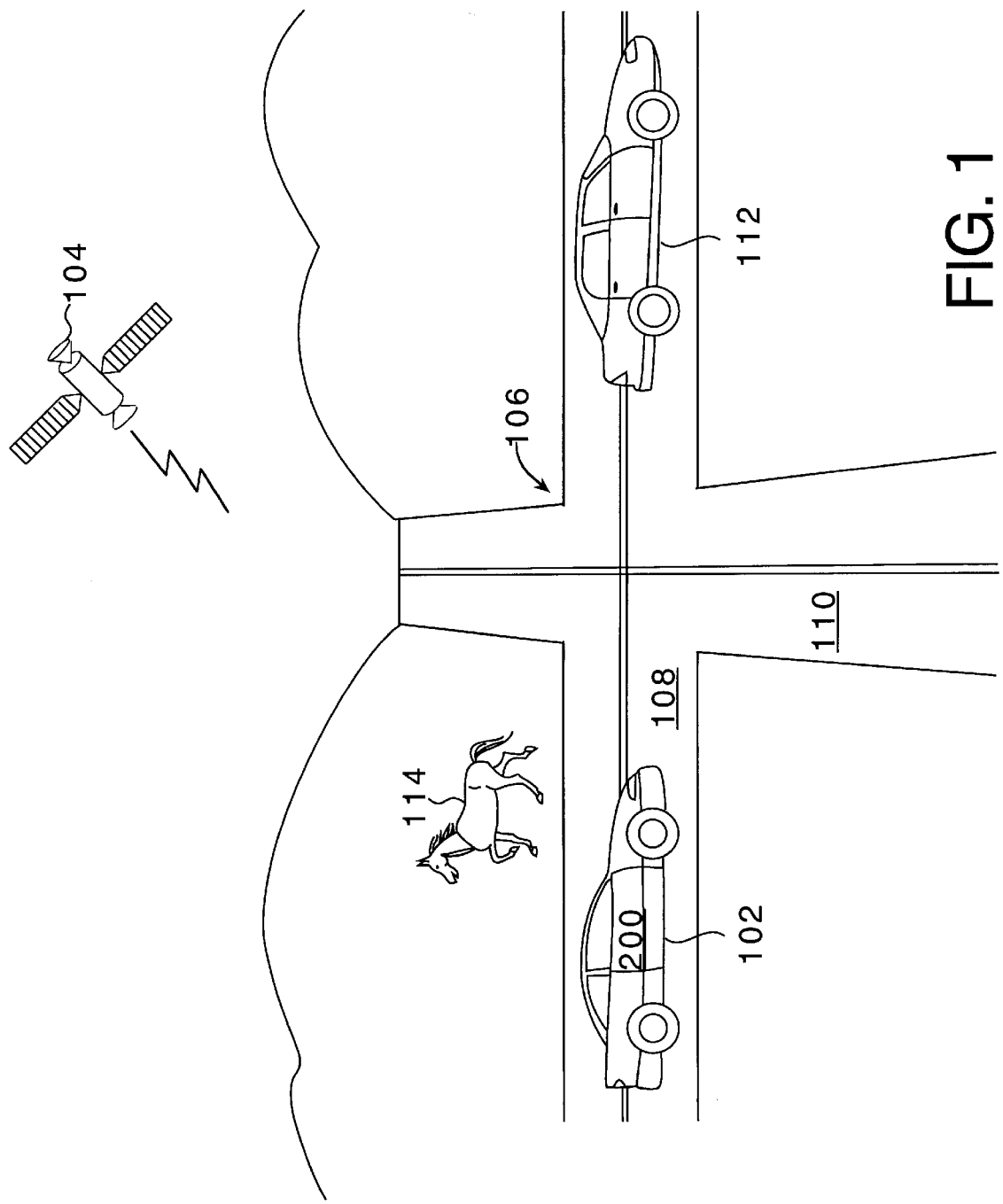
FIG. 1 is a diagram of an operating environment of one embodiment of the present invention.

FIG. 1 shows an exemplary operating environment according to one embodiment of the present invention. In this embodiment, the method and apparatus described is resident in automobile 102. In other embodiments, the present invention could be used in another type of moving vehicle, including an aircraft. In other embodiments, the present method and apparatus could also be used wherever it is necessary to sense hazards and generate responses, for example, in a factory environment where it is necessary to detect anomalous occurrences in an automatic assembly line.

According to FIG. 1, system 200 according to one embodiment of the present invention resides on automobile 102. Automobile 102 proceeds down roadway 108 approaching intersection 106 with roadway 110. Automobile 112 precedes automobile 102 on roadway 108. Animal 114 is an example of an object exterior to automobile 102 that may or may not be moving toward or away from automobile 102. Global Positioning System (GPS) satellite 104 is in communication with system 200, as will be described in more detail below.

Figure 2:
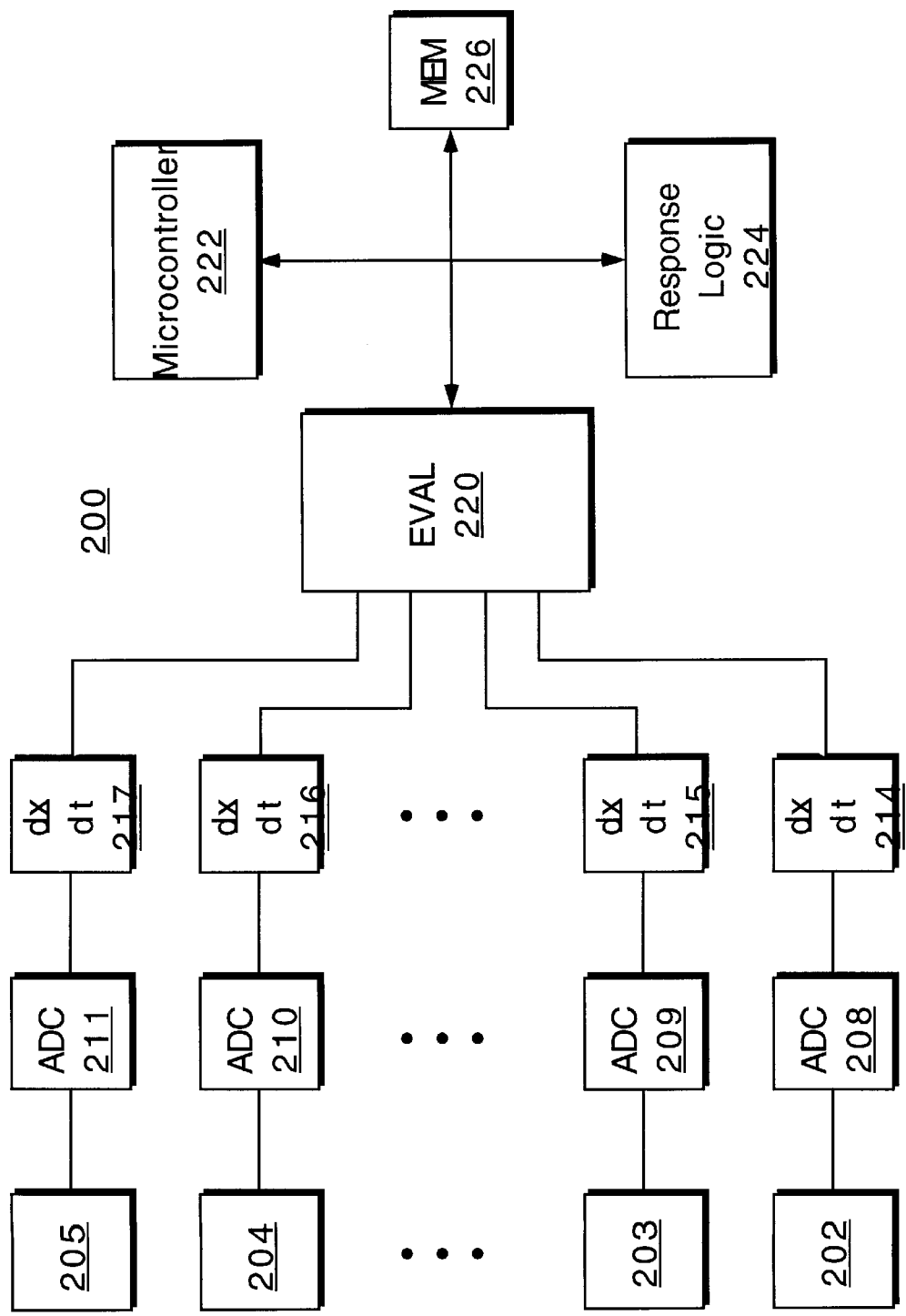
FIG. 2 is a block diagram of one embodiment of the hazard detection and distraction avoidance system of the present invention.

FIG. 2 is a block diagram of system 200 according to one embodiment of the present invention. System 200 includes sensor units 202, 203, 204 and 205. Sensor units 202–205 comprise an array of sensors located in various areas of automobile 102. System 200 as shown includes four sensor units, but may include many more sensors, or less sensors than four. Each of sensors 202–205 is coupled to an analog to digital converter (ADC). Specifically, sensors 202–205 are coupled to ADCs 208,209,210 and 211, respectively. As will be described more specifically below, sensors 202–205 generate analog signals which are transmitted to ADCs 208–211 for conversion to digital signals. Each of ADCs 208–211 are coupled to a corresponding rate determination circuit. Particularly, ADCs 208–211 are coupled to rate determination circuits 214, 215, 216 and 217, respectively. In this embodiment, rate determination circuits 214–217 each comprise a circuit that effectively differentiates the digital signal received in order to calculate a rate of change of the particular condition sensed by the associated sensor. For example, if sensor 205 senses the distance between automobile 102 and automobile 112, rate determination circuit 217 calculates a change in the distance between automobiles 102 and 112 over time. In one embodiment, rate determination circuits 214–217 effectively perform a differentiation of condition values supplied by sensors 202–205.

Rate determination circuits 214–217 also establish a baseline value for a rate of change of a particular condition. The baseline value represents an acceptable, or safe value for the rate of change as calculated over time. The baseline value represents the rate of change actually experienced over time to be "typical" for a condition. For example, moving automobile 102 may approach moving automobile 112 at rates gradually ranging above and below 20 mph. Assume rate determination circuit establishes the baseline rate to be 20 mph. Baseline rate 20 mph may be exceeded or the actual rate may drop below the baseline rate without prompting further action unless a rate of change from the baseline rate exceeds a predetermined value. If the actual rate changes gradually around a new baseline value, the baseline value will be changed. If the acceleration or deceleration of automobile 112 from the baseline rate is determined to be excessive, however, further action is taken. Thus, the rate determination circuit uses both the first and second derivatives of the sensed condition measure to monitor the condition. The rate determination circuit associated with the sensor sensing this condition generates a potential hazard signal which is transmitted to evaluation circuit 220. As will be discussed below, an unacceptable deviation, or acceleration value is determined from a data structure stored in memory 226.

When evaluation circuit 220 receives a potential hazard signal from one of rate determination circuits 214–217, the potential hazard signal is decoded to indicate the nature of the potential hazard. Whether a given potential hazard may constitute an actual hazard depends in many cases upon other conditions. For example, assume automobile 102 approaches automobile 112 such that a change in the rate of change of the distance between the two automobiles generates a potential hazard signal. Upon receiving the potential hazard signal, evaluation circuit 220 decodes the signal, determines the nature of the potential hazard, and checks any relevant additional conditions to determine whether an actual hazard exists. In this case, evaluation circuit 220 reads current baseline rate information from a rate determination circuit that outputs a rate at which automobile 102 is accelerating or decelerating with respect to the ground. If automobile 102 is slowing down with respect to the ground at a rate that is adequate to compensate for the rate of decrease in distance between automobile 102 and automobile 112, evaluation circuit 220 determines that the potential hazard is being handled and no further action is necessary on the part of system 200.

Many different conditions can be sensed by sensors 202–205. The conditions and potential hazards described herein are merely examples and do not constitute an exhaustive list. The technology employed by sensors 202–205 may be one or more of a variety of known technologies, such as radar, laser, or radio frequency, as most appropriate for the condition sensed.

Various sensors of the sensor array comprising sensors 202–205 detect road conditions, such as a wet or icy road surface. Several sensors at different locations of automobile 102 sense distances to exterior objects. A positioning sensor is used with GPS satellite 104 to determine automobile 102's relative position with respect to an identified location in automobile 102's path. For example, by communicating with GPS satellite 104, the sensor can determine whether automobile 102 is approaching intersection 106 at a potentially hazardous speed.

Evaluation circuit 220 is coupled to microcontroller 222, memory 226 and response logic 224. Microcontroller 222 receives signals from evaluation circuit 220 when evaluation circuit 220 determines that an actual hazard exists. Microcontroller 222 then generates a command vector that is transmitted to response logic 224. Response logic 224 in turn transmits signals that control various systems within automobile 102 based upon the nature of the actual hazard as encoded in the command vector. Examples of actions taken by response logic 224 include issuing an audible warning over a speaker to a driver of automobile 102 that describes a hazard condition. Response logic 224 also generates signals to manipulate automobile 102's brake or steering systems upon detection of skidding or oversteering. When a hazard condition is detected in the presence of active automobile systems such as a radio or car telephone, response logic 224 issues signals to reduce operator distractions including turning down the volume on the radio and disabling the car telephone.

Memory 226 includes areas for storing history information. Specifically, these areas may be controlled by microcontroller 222 to keep a history of evaluated conditions as characterized by signals from evaluation circuit 220. Memory circuit 226 also includes data structures defining potential and actual hazards in terms of acceptable and unacceptable rates of change of various conditions. Memory controller 222 also stores appropriate responses to be taken by response logic 224 in the case of various defined actual hazard conditions. These data structures in memory 226 may be programmed to define actual hazards and potential hazards and appropriate responses in any way desired. For example, data structures may be stored for use under various conditions, in various geographic areas, or for various operators of automobile 102.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A system for detecting hazardous conditions during operation of a vehicle, comprising:
a plurality of sensors that monitor a plurality of conditions and transmit condition signals each representing a measure of a condition;
a plurality of rate determination circuits coupled to the sensors that continually receive the condition signals, wherein each rate determination circuit calculates rates of change for the condition, including a baseline rate of change, and outputs a potential hazard value representing a deviation of a rate of change from the baseline rate that exceeds a predetermined threshold value; and
an evaluation circuit that receives the potential hazard value, calculates a new potential hazard value using the potential hazard value and a rate of change for at least one associated condition and determines whether an actual hazard exists by comparing the new potential hazard value with a stored value that corresponds to the condition.

2. The system of claim 1, further comprising:
a computing device that receives an actual hazard signal from the evaluation circuit when it is determined that an actual hazard exists and generates a command; and
response logic that receives the command from the computing device and takes a particular action.

3. The system of claim 2, further comprising a storage element coupled to the computing device, the evaluation circuit, and the response logic that, in response to a command from the computing device, defines an action to be taken in the event of the hazard.

4. The system of claim 3, wherein the information regarding the definition of the hazard includes at least one maximum rate of change of a condition.

5. The system of claim 2, wherein the particular action comprises generating an audible message informing an operator of the vehicle of an impending hazard.

6. The system of claim 5, wherein the audible message includes an identification of a type of hazard and a recommended response.

7. The system of claim 2, wherein the particular action comprises disabling a vehicle radio speaker and disabling a vehicle telephone.

8. The system of claim 7, wherein the particular action comprises controlling a vehicle braking system and a vehicle steering system.

9. The system of claim 1 wherein the plurality of sensors comprises a vehicle speed sensor that senses a speed of the vehicle with respect to the ground.

10. The system of claim 9, wherein the plurality of sensors comprises a distance sensor that senses a distance between the vehicle and an object exterior to the vehicle.

11. The system of claim 10, wherein the plurality of sensors comprises a road condition sensor that senses a condition of the road including moistness and temperature.

12. The system of claim 6, wherein the plurality of sensors comprises a position sensor that communicates with a global positioning system (GPS) satellite and determines a position of the vehicle with respect to a particular location.

13. The system of claim 1, wherein the potential hazard value is generated when a rate of change deviates by a defined margin from the baseline rate of change.

14. A method for detecting and responding to hazards during operation of a vehicle, comprising the steps of:

sensing a plurality of conditions namely:
a distance between the vehicle and an exterior object, a distance between the vehicle and a location as indicated by a signal from a global positioning system (GPS) satellite, a condition of a road surface, including a dryness of the road surface and the presence of ice on the road surface, a condition wherein a wheel of the vehicle loses traction on the road surface, an orientation of a steering mechanism of the vehicle with respect to a direction of motion of the vehicle;

determining a baseline rate of change for each of the plurality of conditions;

detecting a deviation from at least one of the baseline rates of change;

determining whether the deviation indicates an actual hazard; and if so, taking a response action associated with the actual hazard.

15. The method of claim 14, wherein the step of determining the baseline rate of change includes differentiating a measurement of the condition sensed over time.

16. The method of claim 14, wherein the step of determining whether the deviation indicates an actual hazard includes considering rates of change of more than one of the plurality of conditions.

17. The method of claim 14, further comprising the step of storing a data structure including definitions of actual hazards and responses to be taken on a storage device.

18. The method of claim 14, further comprising the step of receiving an indication of an actual hazard and issuing a command to a response logic circuit, wherein the response logic circuit generates a plurality of signals to cause the response action to be performed.

19. The method of claim 14, wherein the response action comprises generating an audible signal indicating a nature of the actual hazard and a recommended operator action.

20. The method of claim 19, wherein the response action comprises controlling a steering system and a braking system of the vehicle.

21. The method of claim 20, wherein the response action comprises disabling a vehicle radio and a vehicle telephone.

* * * * *